Dec. 11, 1956  G. STAVIS  2,774,038
PHASE DISCRIMINATOR
Filed Oct. 8, 1952  2 Sheets-Sheet 1
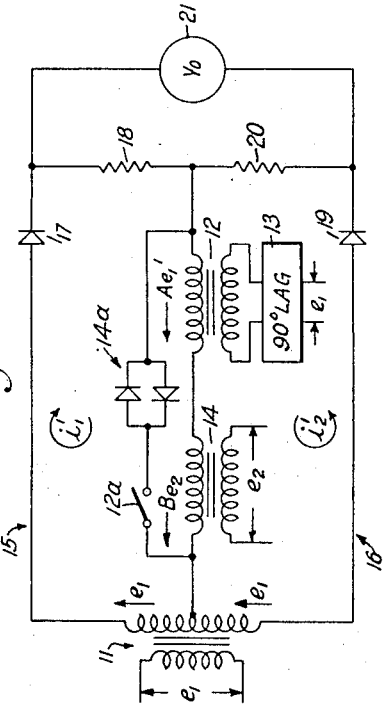
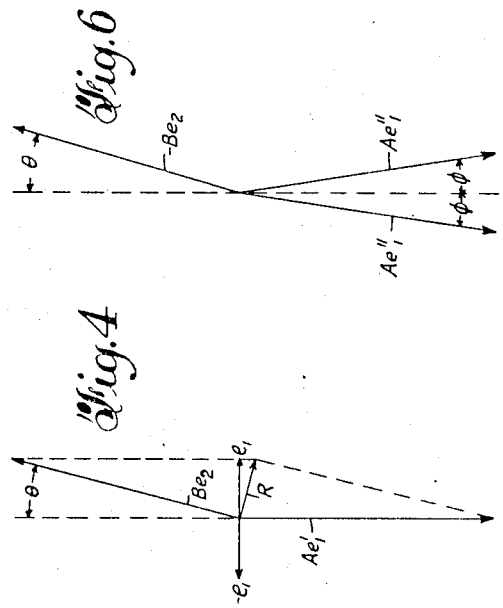
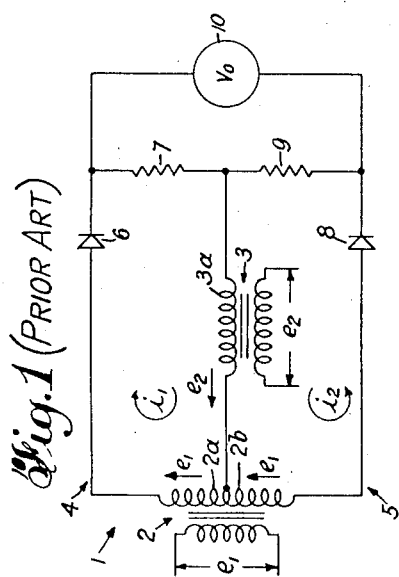
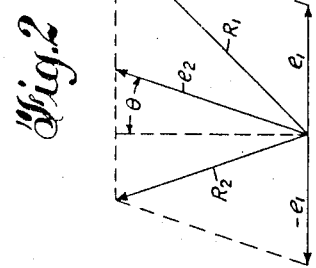
INVENTOR
GUS STAVIS
BY Ernest Fanwick
ATTORNEY Dec. 11, 1956  G. STAVIS  2,774,038
PHASE DISCRIMINATOR
Filed Oct. 8, 1952  2 Sheets-Sheet 2
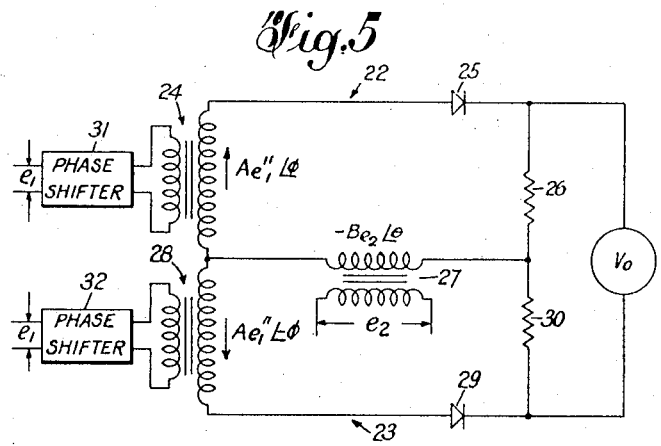
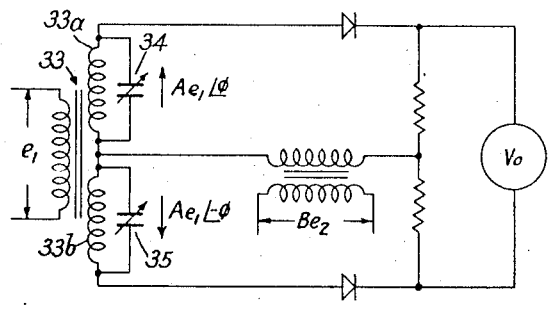
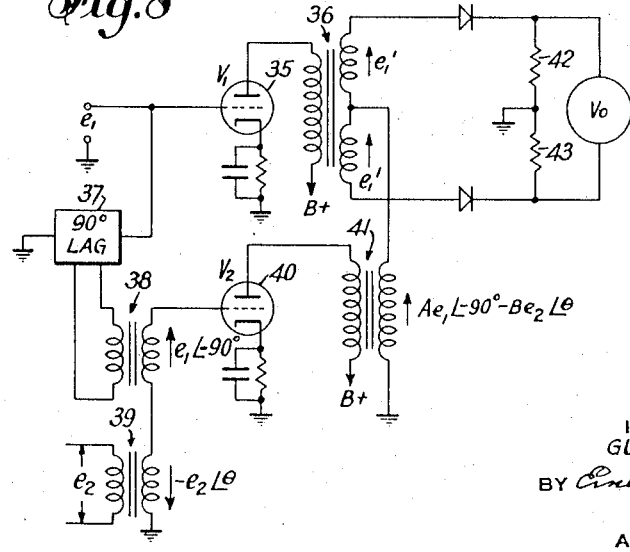
INVENTOR
GUS STAVIS
BY Ernest Fanwick
ATTORNEY

United States Patent Office 2,774,038
Patented Dec. 11, 1956

2,774,038

PHASE DISCRIMINATOR

Gus Stavis, Ossining, N. Y., assignor to International Telephone and Telegraph Corporation, a corporation of Maryland Application October 8, 1952, Serial No. 313,635

12 Claims. (Cl. 324—87)

This invention relates to phase discriminator circuits and more particularly to a circuit for detecting small differences in the phase angle of two input signals having the same frequency.

There are presently known many electronic indication systems which derive information from the relative phase of two input signals such as the Civil Aeronautics Administration phase comparison localizer system or the CAA omnidirectional radio ranges, both used as aircraft navigation aids. In these systems it is necessary to compare the phase difference between two input signals, but in the past extreme difficulty has been encountered when the phase angle between the input signals was extremely small. A great need has been felt for an improved phase discriminator circuit which has greater sensitivity than the usual and conventional phase detectors operating in these known systems.

One of the objects of this invention, therefore, is to provide an improved phase discriminator circuit having greater sensitivity than discriminator circuits heretofore known.

Another object of this invention is to provide a simple phase discriminator circuit which is capable of accurately detecting small differences in phase angle between two input signals of substantially the same frequency.

A further object of this invention is to provide an improved phase discriminator circuit for use with electronic indication phase comparison systems which will detect small differences in phase angle with great sensitivity.

A feature of this invention is the use of two high-level signals whose magnitude is proportional to the input signals whose phase difference is to be detected and to buck out these high-level signals in an improved discriminator circuit to obtain a small difference voltage which is then compared in phase with one of the two original input voltages at a lower level enabling the detector to measure small phase differences with extreme sensitivity.

Another feature of this invention is the use of two high-level signals whose magnitude is proportional to the input signals whose phase difference is to be detected and to buck out these high-level signals to obtain a small difference voltage which is then amplified and compared in phase with one of two original input signals at a lower level to obtain a D.-C. voltage which is proportional to the phase difference between the two input signals.

The above-mentioned and other features and objects of this invention will become more apparent by reference to the following description taken in conjunction with the accompanying drawings, in which:

Fig. 1 is a schematic circuit diagram of a conventional prior art phase discriminator;

Fig. 2 is a vector diagram helpful in the explanation of the circuit shown in Fig. 1;

Fig. 3 is a schematic circuit diagram of one embodiment of an improved phase discriminator in accordance with the principles of this invention;

Fig. 4 is a vector diagram helpful in the explanation of the network shown in Fig. 3;

Fig. 5 is a schematic circuit diagram of a modified embodiment of an improved phase discriminator in accordance with the principles of this invention;

Fig. 6 is a vector diagram helpful in the explanation of the modified phase discriminator shown in Fig. 5;

Fig. 7 is a schematic circuit diagram of still another embodiment of an improved phase discriminator utilizing a coupling transformer having two tuned secondary windings; and Fig. 8 is a schematic circuit diagram of a modified embodiment of an improved phase discriminator wherein the small difference voltage obtained from the difference of the two high-level signals is first amplified before being compared with the low-level signal.

Referring to Fig. 1, a conventional prior art phase detector circuit is shown wherein the two input signals $e_1$ and $e_2$, which are to be compared in phase, and have substantially the same frequency, are coupled to the phase discriminator circuit 1 through coupling transformers 2 and 3. The phase discriminator circuit 1 comprises two loops 4 and 5. Loop 4 consists of a portion 2a of the secondary winding of coupling transformer 2, a directional element 6, such as a crystal rectifier or diode, a load resistor 7, and the secondary winding 3a of coupling transformer 3. Loop 5 consists of a portion 2b of the secondary winding of coupling transformer 2, a directional element 8, a load resistor 9, and the secondary winding 3a of coupling transformer 3. The common portion of loops 4 and 5 which is coupled between the mid-point of the secondary winding of transformer 2 and the common junction of load resistors 7 and 9 comprises the secondary winding 3a of the coupling transformer 3. The phase indicator 10 comprises a D.-C. voltmeter which is tied across the load resistors 7 and 9. Due to the winding characteristics of coupling transformers 2 and 3, the currents $i_1$ in loop 4 may be designated as clockwise while the loop currents $i_2$ in loop 5 may be designated as counterclockwise. The relationship between the output D.-C. voltage $V_0$ across the load resistors 7 and 9 and the phase difference $\theta$ between the input signals $e_1$ and $e_2$ may be determined by referring to the vector diagram of Fig. 2. The resultant magnitude $R_1$ of the voltage in loop 4 is equal to the vectorial addition of the input signal voltage $e_1$ induced in the secondary winding of coupling transformer 2 plus the input signal voltage $e_2$ induced in the secondary winding of coupling transformer 3. The resultant magnitudes $R_2$ of the voltages in loop 5 is equal the vectorial addition of the input signal voltage $e_2$ induced in the secondary winding of coupling transformer 3 minus the input signal voltage $e_1$ induced in the secondary winding of the coupling transformer 2. The output D.-C. voltage is seen to be equal to the resultant magnitudes $R_1$ of the voltages in loop 4 minus the resultant magnitude $R_2$ of the voltages in loop 5 times a constant. The output D.-C. voltage or difference in the resultant magnitudes $R_1$ and $R_2$ is a function of the phase difference $\theta$ of the two input signals $e_1$ and $e_2$. Thus it is obvious if the two input signals are in phase $R_1=R_2$ and there will be no output voltage and as the phase difference $\theta$ increase, the difference between the resultant magnitudes $R_1$ and $R_2$ will increase as a sine function of the angle $\theta$. This relationship is substantially true for all small angles, i. e. for angles less than 45° the error will be less than 10%. It is obvious that the sensitivity of this prior art phase discriminator circuit is substantially a sine $\theta$ function at the null point where $e_1=e_2$; and the sensitivity of the circuit, which may be defined as the differential of the output voltage and the phase angle $$\frac{dV_0}{d\theta}$$

can only be increased by increasing the magnitudes of $e_1$ and $e_2$. The magnitudes of $e_1$ and $e_2$ can be increased only to the extent permitted by the operating level of the associated components contained in the circuit.

Referring to Fig. 3, an improved phase discriminator circuit in accordance with the principles of this invention is shown wherein the limitation on the increase of the magnitudes of the input signal is eliminated and a greater sensitivity over prior art phase discriminator circuits is obtained by utilizing two high-level signals $Ae_{1'}$ and $Be_2$ whose magnitude is proportional to the input signals $e_1$ and $e_2$ and then "bucking" out these high-level signals to obtain a small difference voltage which is then compared in phase with original input voltage $e_1$ at a lower level. Input signal voltage $e_1$ is coupled to the primary winding of coupling transformer 11. A second input voltage designated $Ae_{1'}$ is induced in the secondary winding of coupling transformer 12. Induced voltage $Ae_{1'}$ is $-90°$ out of phase with original voltage $e_1$ which is fed to a phase shifter 13 whose output is coupled to the primary winding of transformer 12. $Ae_{1'}$ is "A" times greater than the original input signal $e_1$ due to the winding characteristics of transformer 12. A third input voltage $Be_2$ which is "B" times greater than original input signal $e_2$ is induced in the secondary winding of coupling transformer 14. The magnitudes of the constants A and B are so adjusted that they are approximately equal. Thus, the improved phase discriminator shown in Fig. 3 comprises two loops 15 and 16 each of which is substantially identical to the loops of the circuit shown in Fig. 1. The loop 15 comprises a portion of the secondary winding of coupling transformer 11, a directional element 17, a load resistance 18, and the secondary windings of coupling transformers 12 and 14. The current flow in this loop $i_{1'}$ may be designated as clockwise. The loop 16 comprises the remaining portion of the secondary winding of coupling transformer 11, directional element 19, load resistance 20, and the secondary windings of coupling transformers 12 and 14. The D.-C. voltage output across load resistances 17 and 19 as indicated by meter 21 is proportional to the phase difference between the original input signals $e_1$ and $e_2$.

The vector diagram of Fig. 4 shows the relationships of the voltages induced in the discriminator circuit of Fig. 3. The original input signal voltage $e_1$ leads the induced voltage $Ae_{1'}$ by 90°. The phase difference between $e_1$ and $e_2$ is equal to $\theta$. The magnitudes of $Ae_{1'}$ and $Be_2$ are substantially equal. The original input signal voltage $e_1$ is seen to substantially equal the vectorial addition of the voltages $Ae_{1'}$ and $Be_2$ induced in the secondary windings of coupling transformers 12 and 14. It is obvious that since the resultant R of the voltages $Ae_{1'}$ and $Be_2$ is comparable to $e_1$, the operation of the circuit shown in Fig. 3 is comparable to the operation of the circuit shown in Fig. 1 as explained by the vector diagram of Fig. 2, except that its sensitivity is greatly magnified, that is for small changes in phase difference $\theta$ the differential of the output voltage $V_0$ to the phase difference $\theta$ is greater for angles near zero. When the phase difference $\theta$ between the input signal voltages $e_1$ and $e_2$ is zero and $Be_2$ substantially equals $Ae_{1'}$, the D.-C. output voltage $V_0$ is zero and will remain zero as long as $\theta$ equals zero regardless of whether $Ae_{1'}$ equals $Be_2$ or not.

It is apparent that the sensitivity of the circuit shown in Fig. 3 is greater than that of a conventional prior art circuit shown in Fig. 1 when it is assumed for the sake of comparison that $e_1$ equals $e_2$, as it does at a voltage null in a phase comparison system, and at the same time the net operating levels of the crystal rectifiers or diodes 17 and 19 is kept low because $Ae_{1'}$ and $Be_2$ are substantially in mutual juxtaposition and thereby cancel. For large angles $\theta$ the resultant of $Ae_{1'}$ plus $Be_2$ may be so large that the discriminator may saturate and be insensitive; therefore, if the phase detector is to be operated over all values of phase difference $\theta$, such as a discriminator in a servo error detecting circuit has to do, I have found it advisable to close switch 12a putting limiter 14a across coupling transformers 12 and 14 together so that the sum of the voltages developed across the two transformers will not saturate the vectors 17 and 19. This limiter 14a does not affect the performance of this detector circuit when small angles of phase difference $\theta$ are measured.

Referring to Fig. 5, a modified embodiment of the improved phase discriminator circuit in accordance with the principles of this invention is shown wherein phase differences may be determined without saturating the discriminator circuit. The circuit of Fig. 5 comprises two loops 22 and 23. Loop 22 includes the secondary winding of coupling transformer 24, directional element 25, load resistor 26, and the secondary winding of coupling transformer 27; while loop 23 comprises the secondary winding of coupling transformer 28, directional element 29, load resistor 30, and the secondary winding of coupling transformer 27. A voltage is induced in the secondary winding of transformer 27 which is substantially equal to the voltage $Be_2$ induced in the secondary winding of coupling transformer 14 of Fig. 3 but is in a reverse direction. This voltage may be designated $-Be_2$ and is at an angle $\theta$ from the original signal voltage $e_1$. Signal voltage $e_1$ is fed through phase shifters 31 and 32 and through coupling transformers 24 and 28 to induce voltages $Ae_{1''} \angle \phi$ and $Ae_{1''} \angle -\phi$ in the loops 22 and 23, respectively. The angles $\phi$ and $-\phi$ imparted to voltage $e_1$ by phase shifters 31 and 32, are so adjusted that the voltage $Ae_{1''} \angle \phi$ is equal to the resultant of the vectors $e_1$ and $Ae_{1'}$ shown in Fig. 4 while the voltage $Ae_{1''} \angle -\phi$ is equal to the resultant of the vectors $-e_1$ and $Ae_{1'}$ shown in Fig. 4.

Referring to the vector diagram of Fig. 6, it is obvious that the vector $Ae_{1''} \angle \phi$ may be transformed into the vectors $e_1$ and $Ae_{1'}$ shown in Fig. 4, while $Ae_{1''} \angle -\phi$ may be transformed into $-e_1$ and $Ae_{1'}$ shown in Fig. 4. Thus the circuit of Fig. 5, as explained by reference to the diagram of Fig. 6, operates in a manner similar to the circuit shown in Fig. 3 and explained by the vector diagram of Fig. 4.

Referring to Fig. 7, a modified embodiment of the phase discriminator illustrated in Fig. 5 is shown wherein a coupling transformer having two secondary windings is utilized. The transformer 33 has its two secondary windings 33a and 33b tuned one above and one below resonance by variable condensers 34 and 35 so that the resultant voltages induced in the secondary windings of transformer 33 are substantially equal to those induced in the secondary windings of transformers 24 and 28 of Fig. 5. In all other respects, the operation of the circuit shown in Fig. 7 as identical with the operation of the circuit shown in Fig. 5 for all phase changes $\theta$ between the two original input signal voltages $e_1$ and $e_2$.

In the foregoing embodiments of the phase discriminator circuit of this invention, an unreasonable high voltage source is not required to produce the voltages designated $Ae_1$ and $Be_2$ because only the difference $Ae_1-Be_2$ is utilized in this circuit. Referring to Fig. 8, one embodiment of this invention is shown wherein the difference in the magnified voltages $Ae_1-Be_2$ is taken at a low level and amplified. The original input signal voltage $e_1$ is coupled through electron discharge device 35 and coupling transformer 36 to induce voltages $e_{1'}$ in the secondary winding of the coupling transformer 36. The original input signal voltage $e_1$ is coupled through phase shifter 37, which imparts a 90° lag, to the primary winding of coupling transformer 38. The original signal voltage $e_2$ is coupled to the primary winding of coupling transformer 39. Due to the winding characteristics of transformers 38 and 39, voltages $e_1 \angle -90° - e_2 \angle \theta$ are induced in the secondary windings of coupling transformers 38 and 39 and fed to the grid of electron discharge device 40 where the difference is amplified and coupled to the primary winding of coupling transformer 41. The voltage difference $$Ae_1 \angle -90° - Be_2 \angle \theta$$

is induced in the secondary winding of coupling transformer 41 and fed to the mid-point of the secondary winding of coupling transformer 36. Thus coupled between the mid-point of secondary windings of coupling transformer 36 and the mid-point between the two load resistances 42 and 43 is the same voltage as is shown coupled to the common portion of loops 14 and 15 in the circuit diagram of Fig. 3. Thus by obtaining the difference between $Ae_1$ and $Be_2$ at a low level and amplifying this difference before coupling to the circuit, unreasonably high voltage source is not required to obtain the voltages $Ae_1$ and $Be_2$. In this case since the amplifier 40 is common to $e_1 \angle -90°$ and $e_2 \angle \theta$, $A = B$.

While I have described above the principles of my invention in connection with specific apparatus, it is to be clearly understood that this description is made only by way of example and not as a limitation to the scope of my invention as set forth in the objects thereof and in the accompanying claims.

I claim:

1. A network for measuring the phase difference between two signal voltages, comprising two loop circuits each including at least a directional element and a load resistor, means for producing two relatively high level voltages having magnitudes proportional to and greater than said signal voltages, means for producing in the first of said loops a resultant voltage equal to the difference between said high level signals plus one of said signal voltages, and means for producing in the second of said loops a resultant voltage between said high level voltages minus one of said signal voltages whereby the D.-C. voltage measured across said load resistors is proportional to the difference in phase between said signal voltages.

2. A network for measuring the phase difference between two signal voltages having two loop circuits each including at least a directional element and a load resistor, comprising means to produce two relatively high level voltages having magnitudes proportional to and greater than said signal voltages, means to induce the resultant voltage difference between said high level voltages in each of said loops, and means to induce one of said signal voltages in each of said loops whereby the D.-C. voltage across said load resistances is proportional to the difference in phase between said signal voltages.

3. A network for measuring the phase difference between two signal voltages comprising means to produce two relatively high level voltages having magnitudes proportional to and greater than said signal voltages, means to obtain the resultant voltage difference between said high level voltages, two loop circuits each having means to induce one of said signal voltages in said loops, a directional element and a load resistor, and means common to both loops to induce said voltage difference in said loops whereby the D.-C. voltage across said load resistances is proportional to the difference in phase between said signal voltages.

4. A network according to claim 3, which further includes means to amplify said voltage difference.

5. A network for measuring the phase difference between two signal voltages comprising means to produce two relatively high level voltages having magnitudes proportional to and greater than said signal voltages, two loop circuits each including a directional element and a load resistor, means common to both loops to induce the first of said high level voltages in both loops, means to induce in the first of said loops a first voltage resultant equal to the second of said high level voltages, and means to induce in the second of said loops a second voltage resultant equal to the second of said high level voltages minus one of said signal voltages whereby the D.-C. voltage across said load resistances will be proportional to the difference in phase between said signal voltages.

6. A network according to claim 5, wherein said means to induce said first and second voltage resultants includes a transformer having a primary and two secondary windings one in each of said loops, capacitive means across each of said secondary windings to form two resonant circuits, and means to adjust the first of said resonant circuits to resonate at a frequency above the frequency of said input signal whereby the voltage induced in the secondary winding of said first resonant circuit will be equal to the second of said high level voltages plus one of said signal voltages, and means to adjust the second of said resonant circuits to resonate at a frequency below the frequency of said input signal whereby the voltage induced in the secondary winding of said second resonant circuit will be equal to the second of said high level voltages minus said signal voltage.

7. A network according to claim 5, wherein said means to induce said first and second voltage resultants includes a first transformer having a primary winding and a secondary winding in the first of said loops and a second transformer having a primary winding and a secondary winding in the second of said loops, means to couple one of said input signals to the primary winding of said first transformer, means to adjust the phase of said input signal coupled to the primary winding of said first transformer so that the voltage induced in the secondary winding of said first transformer is equal to the voltage resultant of one of said high level voltages plus one of said signal voltages, means to couple said input signal to the primary winding of said second transformer, and means to adjust the phase of said signal coupled to the primary of said second transformer whereby the voltage induced in said secondary winding of said second transformer is equal to the voltage resultant of one of said high level voltages minus said input signal voltage.

8. In a phase discriminator circuit having at least first, second, and third inductance devices each having a primary and secondary winding, a first and second rectifying means, and a first and second load resistance; a first circuit comprising in series in the order named a portion of secondary winding of said first inductance device, said first rectifying means, said first load resistance, and said secondary windings of said second and third inductance devices, a second circuit comprising in series in the order named the other portion of the secondary winding of said first inductance device, said second rectifying means, said second load resistance, and said secondary windings of said first and third inductance devices; means to couple a first input signal to said primary winding of the first inductance device; means to induce in the secondary winding of said second inductance device a voltage proportional to said first input signal; a second input signal source; means to induce in the secondary winding of said third inductance device a voltage proportional to said second input signal wherein the ratio of the voltage induced in the secondary winding of said third inductance device to said second input signal is substantially the same as the ratio of the voltage induced in said secondary winding of the second inductance device to said first input signal whereby the D.-C. voltage across said first and second load resistance will be proportional to the difference in phase between said first and second input signals.

9. A circuit according to claim 8, which further includes means to limit the voltages developed across the secondary windings of said second and third inductance devices.

10. In a phase discriminator circuit having at least a first inductance device having one primary and two secondary windings, a second inductance device having a primary and secondary winding, a first and second rectifying means, and a first and second load resistance; a first network loop comprising in series in the order named the first secondary winding of said first inductance device, said first rectifying means, said first load resistance, and said secondary winding of said second inductance device; a second circuit comprising in series in the order named the second secondary winding of the first inductance device, said second rectifying means, said second load resistance, and said secondary winding of said second inductance means; means to couple a first input signal to said primary winding of the first inductance device, a capacitor across each of said secondary windings of said second inductance device so that the voltage induced in each of said secondary windings is proportional to and greater than one of said input signals but having a phase difference therewith, means to induce in the secondary winding of said second inductance device a voltage proportional to and greater than a second input signal, and means to measure the D.-C. voltage across said load resistances whereby the D.-C. voltage will be proportional to the difference in phase between said first and second input signals.

11. A circuit according to claim 10, wherein said voltage induced in said first secondary winding of said first inductance device is equal to the resultant of one of said input signals plus a high level voltage proportional in magnitude to said input signal and lagging in phase by 90° and the voltage induced in said second secondary winding of said first inductance device is equal to the resultant of a high level voltage proportional in magnitude to said input signal and lagging in phase 90° minus said input signal voltage.

12. In a circuit for measuring the phase difference between two input signals having at least a first and second inductance device each having a primary and secondary winding, a first and second rectifying means, and a first and second load resistance; a first circuit comprising in series in the order named a portion of the secondary winding of said first inductance device, said first rectifying means, said first load resistance, and said secondary winding of the second inductance device, a second circuit comprising in series in the order named the other portion of the secondary winding of the first inductance device, said second rectifying means, said second load resistance, and said secondary winding of said second inductance means, means to produce the voltage difference between said two signal voltages, means to amplify said resultant difference, means to induce said amplified voltage difference in the secondary winding of said second inductance means, and means to induce in the secondary winding of the first inductance means a voltage proportional to one of said input signals whereby the D.-C. voltage measured across said first and second load resistances will be proportional to the difference in phase between said first and second input signals.

References Cited in the file of this patent

UNITED STATES PATENTS

| | | |
|---|---|---|
| 2,429,216 | Bollman et al. | Oct. 21, 1947 |
| 2,529,723 | Chevallier | Nov. 14, 1950 |
| 2,640,939 | Staschover et al. | June 2, 1953 |